United States Patent Office 2,828,200
Patented Mar. 25, 1958

2,828,200

METHOD OF REMOVING PLATINUM FROM A COMPOSITE CONTAINING PLATINUM AND ALUMINA

William G. Nixon, Westchester, Ill., assignor to Universal Oil Products Company, Des Plaines, Ill., a corporation of Delaware No Drawing. Application July 25, 1955
Serial No. 524,277

2 Claims. (Cl. 75—83)

This invention relates to a process for recovering metals from metal-containing composites. The invention more particularly relates to a process for removing a platinum group metal from a composite in which a platinum group metal is associated with a metal oxide.

Many methods have been devised to recover noble metals from catalytic composites, most of which are unsatisfactory because of their expense and extreme complexity. Present methods usually require that the carrying medium, that is the support for the noble metal, is dissolved leaving a solid material which comprises the catalytic noble metal and all other materials insoluble in the solvent or dissolving medium. The main difficulties with these usual methods are that they require the digestion of large quantities of carrying medium in order to recover extremely small quantities of expensive metal and the material recovered after the digestion of the carrying medium usually is not a pure metal and requires further purification.

Other prior practices for the recovery of metals have included the use of strong acids to dissolve the metal followed by recovery of the metal from the acid solution. When the metal is a noble metal, aqua regia has been used for this purpose. However, this practice has the disadvantage that when the noble metal is in association with a metal oxide, large amounts of the metal oxide are also dissolved. In many cases it is desired to separate the noble metal from the oxide, and in other cases it is desired to recover or remove the noble metal from the metal oxide without destroying the physical characteristics of the metal oxide, but these objectives cannot be accomplished by the prior art practice of using aqua regia. The present invention offers a novel method of accomplishing these objectives. The present specification will be particularly directed to the recovery of noble metals, specifically platinum, with the understanding that the method may also be used for the recovery of other metals, although not necessarily with equivalent results.

Noble metals find particular utility for use as catalysts for the conversion of organic compounds and particularly hydrocarbons. The noble metal preferably is in association with a metal oxide, generally in the form of particles of uniform or irregular size and shape. After use in the process, the catalyst loses its activity and it becomes necessary to subject the catalyst to suitable treatment in order to restore the activity thereof. In one embodiment the present invention offers a novel method of restoring the activity of used catalysts by treatment in the manner to be hereinafter set forth to dissolve the platinum without dissolving the metal oxide to a substantial extent. The metal oxide then may be reimpregnated with additional quantities of the noble metal if desired.

In one embodiment the present invention relates to a method of removing a noble metal from a composite containing a noble metal which comprises treating said composite with aluminum chloride vapors.

In another embodiment the present invention relates to a method of removing platinum from a platinum-alumina composite which comprises treating said composite with gaseous aluminum chloride at an elevated temperature, and recovering the gaseous products.

In a specific embodiment the present invention relates to a method of removing platinum from a platinum-alumina catalyst which comprises introducing aluminum chloride vapors to said catalyst at a temperature within the range of from about 200° F. to about 1600° F., withdrawing vapors after contact with the catalyst, and recovering platinum from said vapors.

In a further embodiment the present invention relates to a method of removing platinum from a platinum-alumina composite which comprises heating said composite in a confined stripping zone to a temperature within the range of from about 200° F. to about 1600° F., introducing aluminum chloride vapors to the composite in said zone, withdrawing gaseous products from said zone, and recovering said gaseous products.

The noble metals for recovery in accordance with the present invention include platinum, palladium, gold, silver, iridium, rhodium, ruthenium, osmium, etc. As hereinbefore set forth, these noble metals are generally associated with a metal oxide and particularly an oxide of a metal in the left hand columns of groups III to VIII of the periodic table including particularly the oxides of aluminum, titanium, zirconium, hafnium, thorium, vanadium, tantalum, antimony, chromium, molybdenum, tungsten, uranium, manganese, cobalt, nickel, etc. It is understood that the catalyst may comprise one or more noble metals and one or more metal oxides. In still other cases, one or more activating components may be included in the catalyst. These activating components generally are acidic and include halides, particularly chlorides and fluorides, other mineral acids, organic acids, etc.; the acidic component or components probably being associated with the metal oxide and/or metal in a combined state.

As hereinbefore set forth, the composite of noble metal or metals with metal oxide or metal oxides is particularly suitable for use as catalysts for effecting reactions of organic compounds and particularly hydrocarbons including such reactions as dehydrogenation, hydrogenation, cyclization, hydrocracking, reforming, oxidation, etc. These reactions are well known in the prior art and the operating conditions such as temperature, pressure, etc. required are described in detail therein.

The novel features of the present invention are particularly adapted to the reactivation of alumina-platinum group metal catalysts and specifically alumina-platinum-combined halogen catalysts which recently have been found to be of particular advantage for use in the reforming of gasoline. In the interest of simplicity, the following description will be directed primarily to the reactivation of catalysts comprising alumina and platinum, with the understanding that the novel features of the invention may be applied to other noble metals and other catalyst compositions. For example, using the method of this invention platinum may be stripped from composites such as alumina-platinum-combined halogen, alumina-platinum, alumina-silica-platinum, silica-platinum, etc.

It is an essential part of the invention that the platinum-containing composite be contacted with aluminum chloride vapors. The platinum is thereby removed or stripped from the other constituents. A vapor stream is removed and the platinum appears in this vapor stream. For example, an alumina-platinum composite may be treated by continuously passing aluminum chloride vapors over the alumina-platinum composite in a confined zone. The effluent vapors are collected and the platinum recovered from these effluent vapors. In another embodiment the alumina-platinum composite may be mixed with solid aluminum chloride, the mixture placed in a confined heating zone and then heated to vaporize the aluminum chloride. The effluent gases from this zone will also contain platinum. In another embodiment the alumina-platinum composite may be mixed with an aqueous solution of aluminum chloride, the mixture placed in a confined heating zone and then heated. The water evaporates and the aluminum chloride vaporizes. The effluent gases from this zone contain platinum. In still another embodiment the alumina-platinum composite is treated with a reactant which reacts with the alumina carrier to form aluminum chloride and it is these aluminum chloride vapors which are formed in situ which strip the platinum from the carrier. For example, an alumina-platinum composite may have the platinum stripped therefrom by placing the composite in a confined treating zone and passing phosphorus pentachloride vapors into contact with the composite. The phosphorus pentachloride reacts with the alumina to form aluminum chloride. The aluminum chloride vapors are the actual stripping medium. Therefore, when alumina is part of the composite, a volatile chlorine-containing substance reactable with the alumina and capable of forming aluminum chloride by reaction with said alumina may be used.

The exact method whereby the aluminum chloride vapors remove the platinum from the platinum-containing vapors is not definitely known. It appears that the aluminum chloride, either as $AlCl_3$ or $Al_2Cl_6$ enters into some sort of a chemical combination or physical association with one or more platinum compounds to form a volatile platinum compound which is withdrawn with the rest of the effluent gases. It also appears that the platinum must be in a chlorinated form before it will be volatilized by the aluminum chloride. The chlorination of the platinum may be done before the platinum-containing composite is contacted with the aluminum chloride vapors or the chlorination may be accomplished simultaneously with the stripping by the aluminum chloride. When the platinum is in the oxidized form in the platinum-alumina composite, it may be converted to the chloride form by contact with aluminum chloride, however it is preferred that there be some water in the system to aid in this reaction, that is the converting of the platinum oxide to the platinum chloride.

The basic steps of the process therefore are contacting the platinum-containing composite with aluminum chloride vapors and then separating the gases from contact with the reactant mixture, that is from contact with the remaining solids. The gases separated from the reactant mixture will contain aluminum chloride vapors as well as the volatile compound or complex of platinum.

The contact of the aluminum chloride vapors or aluminum chloride gas is effected at an elevated temperature and generally at a temperature within the range of from about 200° F. to about 1600° F. and preferably from about 700° F. to about 1100° F. Pure aluminum chloride vapors may be used, or the vapors may be diluted with an inert carrier gas such as $N_2$, $O_2$, $Cl_2$, air, etc. It is preferable that this carrier gas does not react with any of the constituents in the reaction zone.

The contact is for a time sufficient to convert a substantial amount of the platinum in the composite to the volatile form. The exact time is of course dependent upon the temperature, reactant concentration, etc.

After the contact the gases are removed from the reactant mixture. The gases will contain the volatile platinum compound and/or complex and usually will contain large amounts of excess aluminum chloride and carrier or diluent gases if used. The gases may be collected by passing them through water to absorb them, thereby forming an aqueous solution of aluminum chloride and platinum compound, which compound is probably platinum chloride. It appears that the volatile complex or compound of platinum is not stable at lower temperatures and a platinum compound, probably platinum chloride, may be deposited by contacting the effluent gas stream with a cool surface, that is a surface below about 200° F. The compound or complex also appears to disassociate when contacted with water and there are indications that when the effluent vapors are collected in water the water contains platinum chloride. The platinum may be recovered as the metal from this solution by any of the well known methods, such as adding aluminum metal to the solution to reduce the platinum, thereby precipitating platinum metal, or hydrazine hydrate may be used as the reducing agent.

The present invention lends itself readily to a continuous type of process which may be of the concurrent or of the countercurrent type. For example, the countercurrent type of process may be effected by depositing the spent catalytic composite on a slowly moving conveyor in an enclosed space and countercurrently contacting the material with the aluminum chloride-containing gases, removing and recovering the effluent gases. The process of the present invention may also be effected batch-wise in substantially the same manner. One manner of batch-wise operation may be accomplished by depositing the catalytic material on a screen and passing the aluminum chloride vapors into contact with the material after which time the gases are separated and the platinum recovered from the gases as hereinbefore specified. The reaction rate of either a continuous or batch-wise process may be controlled by regulating the time of contact of the gases with the catalytic material, temperature, concentration of the gases, etc. The process may also be effected in a stage-wise concurrent or countercurrent manner.

The following examples are introduced to further illustrate my invention but are not introduced with the intention of unduly limiting the invention to the particular materials or procedure described.

EXAMPLE I

One hundred cc. of an alumina-platinum catalyst containing approximately 0.375% by weight of platinum was placed in a 30 mm. glass tube centrally located in an electrically heated furnace. Four grams of aluminum chloride crystals were placed at the inlet portion of the glass tube and the entire tube heated to 1000° F. Nitrogen was passed downwardly through the tube and in this manner the vaporized aluminum chloride was passed over the catalyst particles. The nitrogen sweep was at the rate of 1000 cc. per minute. At the end of five minutes substantially all of the platinum was stripped from the catalyst bed.

EXAMPLE II

Seventy-five cc. of a spent reforming catalyst containing alumina and approximately 0.4% by weight of platinum was placed in a 30 mm. O. D. furnace tube. A 2 inch layer of glass beads was placed on top of the catalyst. Approximately 10 cc. of anhydrous aluminum chloride was placed on top of the glass beads. The reaction temperature, that is the temperature of the entire tube was maintained at 932° F. Nitrogen was passed downwardly, first into contact with the aluminum chloride and then into contact with the catalyst particles, thereby passing aluminum chloride vapors into contact with the catalyst. The effluent gases were bubbled through water and the platinum in the effluent gas and the aluminum chloride in the effluent gas were readily soluble in water. When a reducing agent, $SnCl_2$, was added to the solution, a qualitative test for platinum was obtained. After five minutes of the stripping operation the catalyst tube was cooled and the catalyst pills analyzed for platinum content. The analysis is given below in the table.

Table

Top ⅓ of catalyst bed—0.0058% by weight of platinum
Middle ⅓ of catalyst bed—0.0053% by weight of platinum
Bottom ⅓ of catalyst bed—0.0053% by weight of platinum The above results indicate that the platinum was substantially removed and recovered from the catalyst particles.

EXAMPLE III

Seventy-five cc. of spent reforming catalyst in the shape of spheres of approximately ⅛ inch average diameter were placed in a heater tube centrally located in an electrically heated furnace. Two cc. of glass beads were then placed on top of the catalyst spheres. The spheres contained alumina and approximately 0.4% by weight of platinum. Approximately 10 grams of phosphorus pentachloride were placed on top of the glass beads. Chlorine gas was passed downwardly, first over the phosphorus pentachloride and then into contact with the catalyst spheres. The temperature in the stripping zone was 932° F. The phosphorus pentachloride slowly volatilized and the chlorine sweep caused the phosphorus pentachloride vapors to contact the catalyst spheres. The chlorine sweep was at the rate of 500 cc. per minute and was continued for five minutes. The effluent gases were condensed and analyzed and indicated platinum as well as aluminum chloride. The phosphorus pentachloride therefore reacted with the alumina to form aluminum chloride, and the aluminum chloride in turn stripped the platinum from the catalyst. At the end of the stripping operation the platinum was almost completely removed from the catalyst spheres. This example illustrates that when an alumina base catalyst is used, then a stripping gas may be used which reacts with the alumina to form aluminum chloride which is the actual volatilizing agent or stripping agent.

The experiment was repeated however this time a platinum-silica composite was used. Phosphorus pentachloride did not remove the platinum from this composite. This additional experiment confirms the fact that it is aluminum chloride which is the stripping agent.

EXAMPLE IV

An alumina-palladium composite was placed in a heater tube and heated to approximately 900° F. Chlorine was passed over the catalyst at the rate of 700 cc. per minute. No palladium appeared in the exit gas. Five grams of anhydrous aluminum chloride was then placed at the inlet and the chlorine sweep continued at the rate of 700 cc. per minute. Immediately, palladium appeared in the effluent gas and after approximately five minutes substantially all of the palladium was removed from the palladium-alumina composite. This example illustrates that other noble metals besides platinum may be removed by stripping with aluminum chloride.

I claim as my invention:

1. A method of removing platinum from a composite comprising platinum and alumina which comprises heating said composite in a confined stripping zone to a temperature within the range of from about 200° F. to about 1600° F., reacting the alumina in said stripping zone with a volatile chlorine-containing material and forming aluminum chloride vapors by the reaction of said material with said alumina, stripping platinum from said composite by said vapors, withdrawing vapors from said zone, and recovering platinum from said vapors.

2. The method of claim 1 further characterized in that said chlorine-containing material comprises phosphorus pentachloride.

References Cited in the file of this patent

UNITED STATES PATENTS

| | | |
|---|---|---|
| 1,876,943 | Hull | Sept. 13, 1932 |
| 2,607,675 | Cross | Aug. 19, 1952 |